April 8, 1947.    W. F. FULTON    2,418,506
HIGH TEMPERATURE CRACKING APPARATUS
Filed Sept. 27, 1943    6 Sheets-Sheet 5

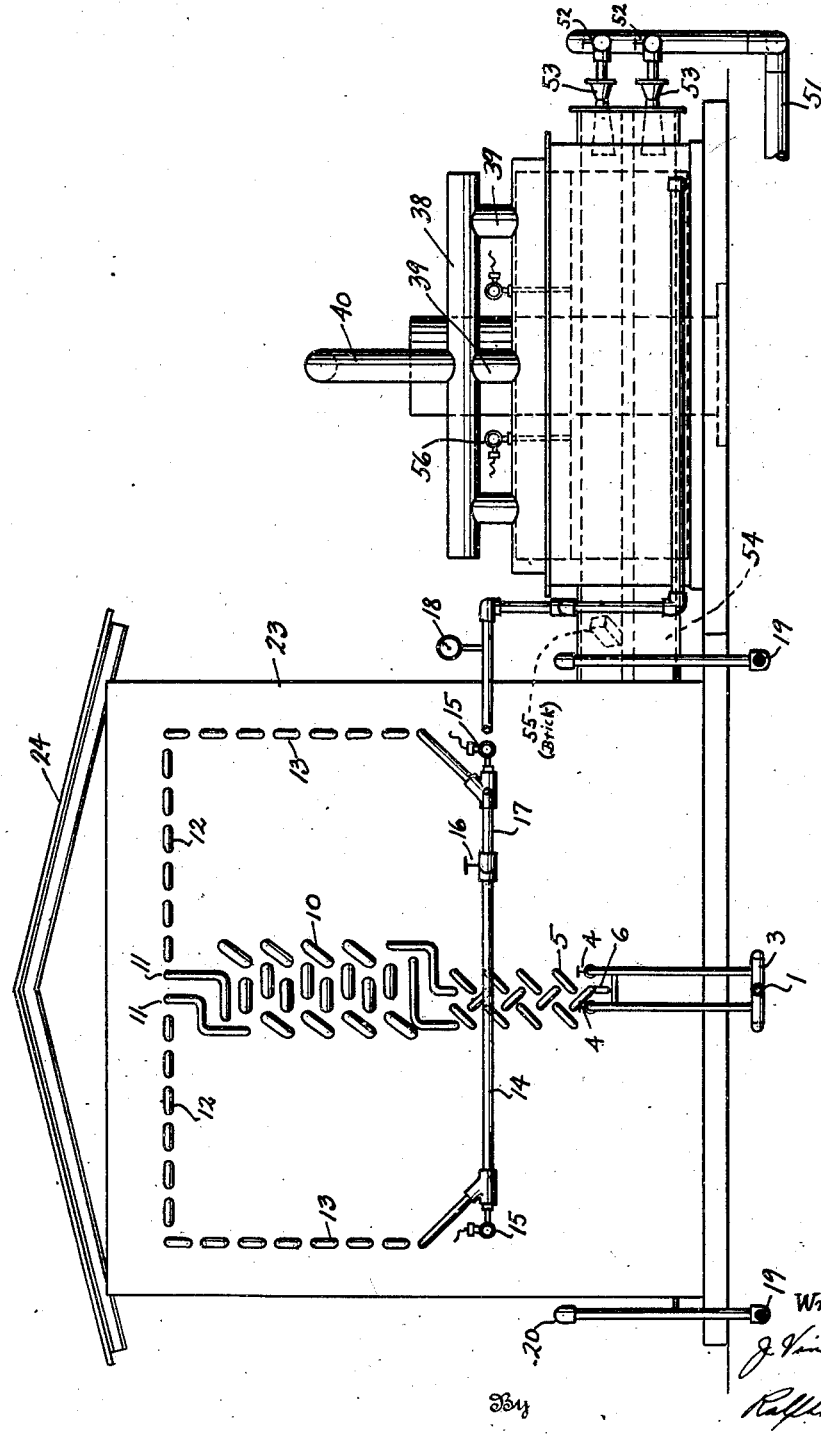

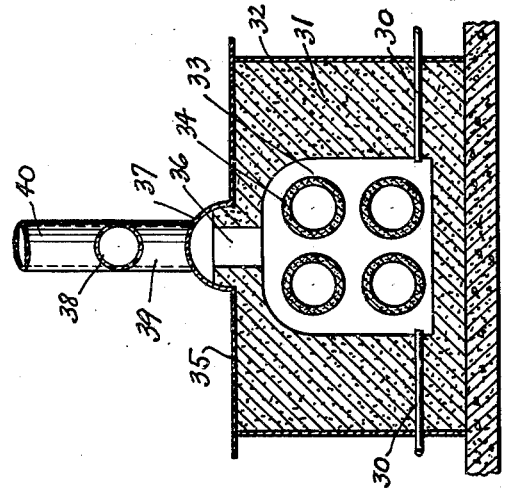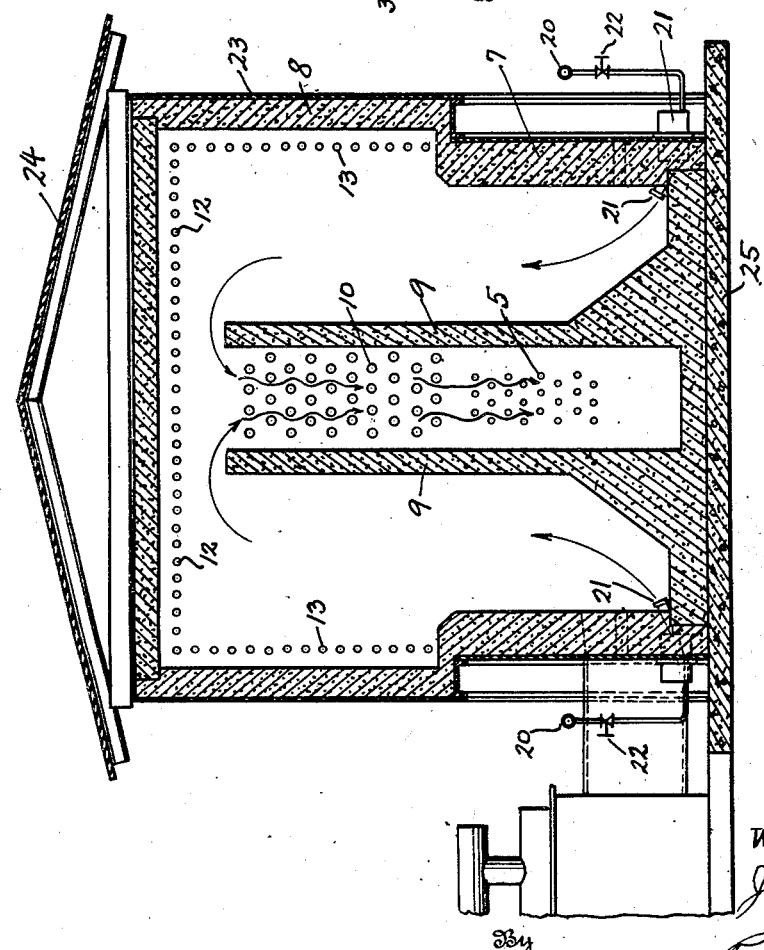

Inventor
Wm. F. FULTON

April 8, 1947.  W. F. FULTON  2,418,506
HIGH TEMPERATURE CRACKING APPARATUS
Filed Sept. 27, 1943  6 Sheets-Sheet 6

Inventor
Wm. F. FULTON.

Patented Apr. 8, 1947

2,418,506

UNITED STATES PATENT OFFICE 2,418,506

HIGH-TEMPERATURE CRACKING APPARATUS

William F. Fulton, Shreveport, La., assignor to United Gas Pipe Line Company, Shreveport, La., a corporation of Delaware Application September 27, 1943, Serial No. 503,934

3 Claims. (Cl. 196—117)

This invention relates in general to molecule cracking apparatus and has for its general object the provision of apparatus capable of receiving and cracking substances existing normally either in the liquid or gaseous form.

It has in the past been well known and widely practiced to change certain complex molecules into simpler molecules by means of subjecting them to high temperatures. Such processes have taken various forms. In one form for example, where the substances to be cracked consisted of combustible hydrocarbons, a portion of the hydrocarbon to be treated has been burned as a fuel directly in the body of hydrocarbon so as to raise the entire body to the cracking temperature. The extent of such combustion has been governed by limiting the amount of oxygen introduced into the mixture. This method, however, leaves in the gas being treated a large amount of inert products of the combustion. This not only results in complicating the gaseous mixture but adds to its volume a large volume of useless gaseous material. In the event that the product consists of gases to be handled by compressors, the additional bulk including the combustion products necessitates a great deal of additional compressor capacity. Such compressor capacity is, of course, highly expensive and requires much critical material.

Another method of raising the material to be cracked to the cracking temperature is to apply a burner to a refractory checker work until the same becomes heated and then to force through the checker work the gas being treated. This, of course, is an intermittent process and is objectionable for that reason. It is also a process in which a constant cracking temperature cannot possibly be maintained and in which it is very difficult to control the final temperature of the gas.

Another attempt to provide suitable conditions for the cracking of molecules has consisted of the use of a refractory tube which is heated by burners or other means applied to its exterior surface. The material to be cracked is caused to flow through the inside of this tube. In order to make the treated material come into close contact with the walls of the tube and still provide a substantial flow capacity within the tube, the tube has been made relatively large and has been provided with a core spaced from the walls of the tube so as to leave an annular passageway through the tube. It has been found impossible to maintain the tube throughout its length at exactly the proper temperature so that the material to be treated in flowing through the tube will exactly reach the cracking temperature before it leaves the tube, and will not reach a higher temperature which would tend to overcrack the product. Specifically, in the case of hydrocarbons being cracked, if the temperature is allowed to become too high the hydrocarbon will be completely broken down into the elements of hydrogen and carbon, or if not completely broken down, then an excessive quantity of these elements will be formed and the carbon will tend to clog up the apparatus as well as to represent a loss of more desirable products.

In view of the foregoing, it is an object of this invention to provide an apparatus for cracking chemical compounds by means of heat, wherein a very accurate control may be maintained upon heat applied to the material being treated.

Another object is to provide such an apparatus which will be capable of receiving liquid as well as gaseous material for treatment.

Still another object of this invention is to provide an apparatus in which heat losses are minimized and hence in which the heat economy of the process as practiced in the apparatus will be relatively high.

Another object of this invention is to provide an apparatus of the character referred to which will employ a minimum of critical materials such as steel and iron and other metals essential to the prosecution of the national war effort.

Another object of this invention is to provide an apparatus in which the cracking may be carried out at substantially atmospheric pressures in order to avoid the necessity for high temperature vessels of great strength and in order that it may be possible to easily maintain a very high velocity of material being cracked as it flows through the furnace.

One other object is to provide such an apparatus in which the cracking process may be abruptly stopped when it has attained the degree desired so that the products will not be overcracked.

Another object of this invention is to provide an apparatus of the type referred to which will lend itself readily to the use of a catalyst in the cracking process.

One other object of this invention is to provide an arrangement wherein the apparatus of this invention may be employed for continuous operation.

Other objects and advantages of this invention will become apparent from the following description taken in connection with the accompanying drawings wherein are set forth by way of il-

3 lustration and example certain embodiments thereof.

In the drawings:

Fig. 3 is an end elevation of the same apparatus looking from the left end of Fig. 1.

Fig. 4 shows a vertical cross section through the preheating or vaporizing furnace illustrated in the upper portion of Fig. 1.

Fig. 5 represents a transverse vertical cross section through the cracking unit properly illustrated in Figs. 1 to 3 inclusive.

Figure 1:
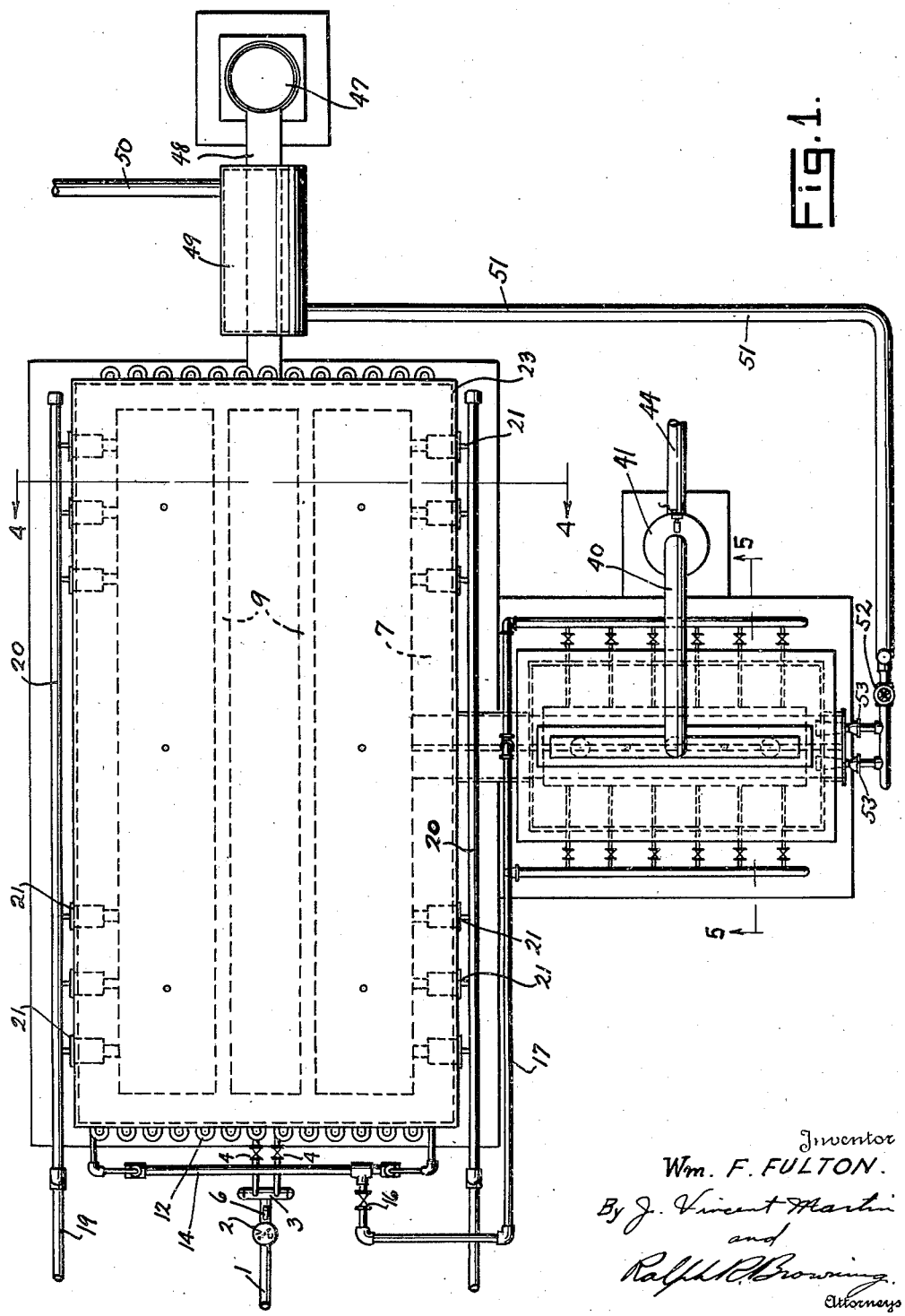
Fig. 1 is a top plan view illustrating a cracking apparatus constructed in accordance with this invention.
Figure 2:
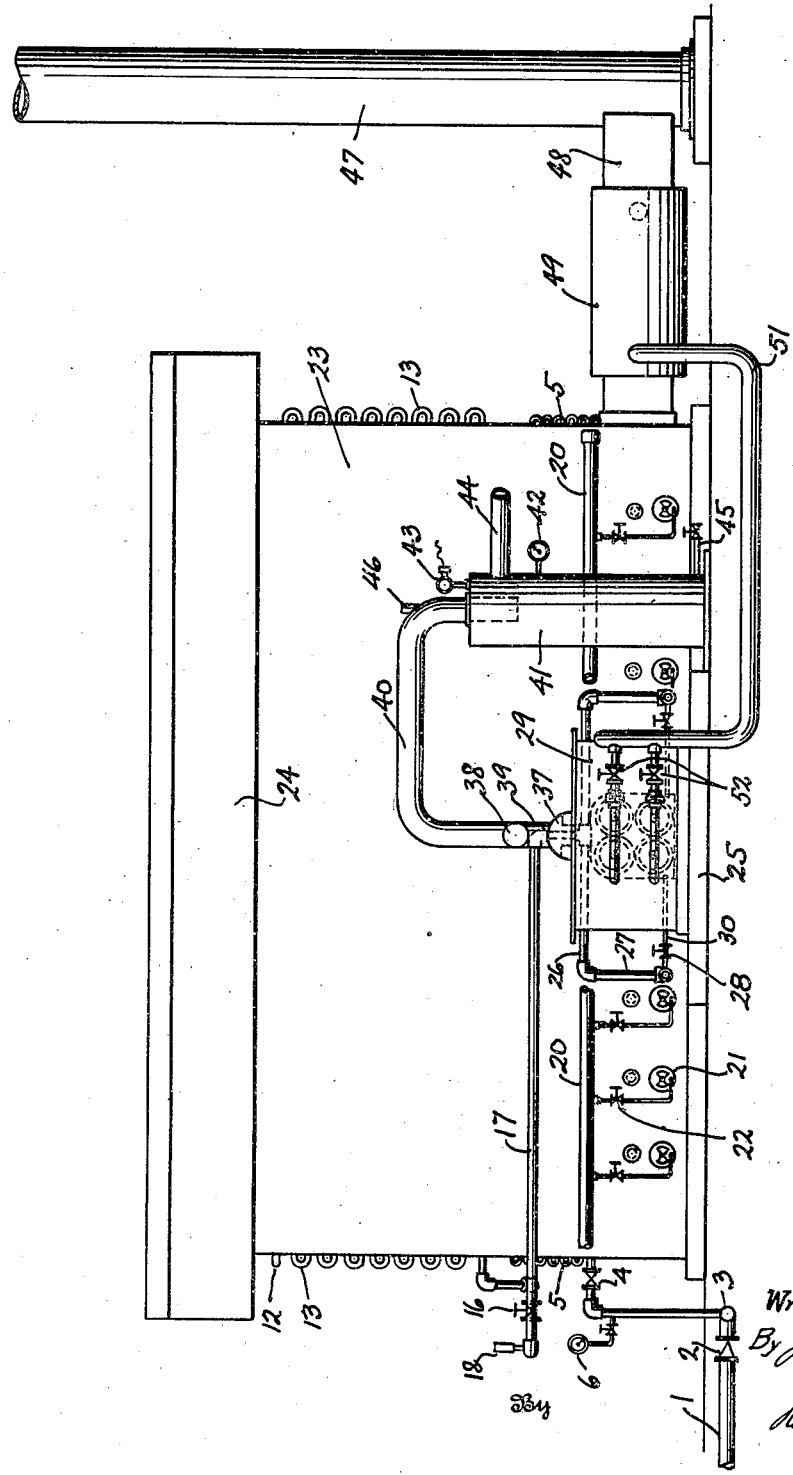
Fig. 2 is a side elevation of the same apparatus.

Referring now more in detail to the drawings, and especially to Figs. 1 to 5 inclusive thereof, the numeral 1 indicates an input line through which the compound to be cracked is led into the apparatus. This inlet line is provided with a check valve 2 and opens into a header 3 which is connected by means of suitable pipes and valves 4 with the primary coils 5 of the preheating or vaporizing furnace. The gauges 6 may be connected with the input line for the purpose of enabling an operator to determine the pressure of oil being fed to the apparatus. In this connection, it will be understood that it is contemplated that the pressure within the preheating or vaporizing furnace will be relatively very low, being only sufficient to cause the material being fed to flow rapidly through the apparatus. For reasons hereinafter set forth it is desired that the products of the cracking operation carried out by this apparatus emerge from the cracking unit at substantially atmospheric pressure.

The preheating or vaporizing unit consists of refractory walls, roof and floor, the walls being inset adjacent their lower portions as illustrated at 7 and continuing upwardly as shown at 8 to the top of the furnace. The floor extends between these two walls and has two upstanding partitions likewise of refractory material and indicated at 9 which extend upwardly from the floor to within a relatively short distance below the top of the furnace.

In the case of a furnace such as that illustrated which is adapted to receive liquid substances to be cracked, the primary coils 5 into which the liquid substance is first fed are of relatively small cross section. These open into the coils 10 which are above the coils 5 and which are of relatively larger cross section so that as the material vaporizes it will be allowed to expand into the larger coils. The coils 10 are connected at their upper ends by means of certain tubular connections 11 to coils 12 which extend horizontally along the top portion of the furnace, and these in turn connect with the coils 13 extending down the inside of the outer walls of the furnace. Each of the coils 13 is connected at its lower end to a header 14 which extends transversely along one end of the preheating or vaporizing unit and which is provided with certain thermo-static temperature controls 15, one at each end, for the purpose of controlling the flow through either the right-hand or left-hand set of coils as the case may be. These thermostatic flow controllers may be arranged in any suitable well known manner and it is believed unnecessary to describe them in more detail.

Connected to the header 14 through a valve 16 is a pipe line 17 having a pressure gauge 18 mounted thereon and leading to the cracking unit of the apparatus. It will be understood that whether the material to be cracked enters the preheating furnace as a liquid or as a gas, it will emerge from such unit as a vapor or gas and in this form will be led to the cracking unit.

The preheating or vaporizing unit may be primarily heated by means of gas or other similar fuel brought in through a pipe line 19 and introduced into a header 20 from which it is fed to burners 21 through valves 22, one such valve being provided for each burner. It will be seen that these burners extend into the preheating furnace at the lower outer corners thereof and that the flame and products of combustion take a path such as indicated by the arrows in Fig. 4. The outlet from the furnace to the stack is at the lower portion of the furnace between the two partitions 9 but is at the end of the furnace opposite that illustrated in Fig. 4 so that the exit does not appear in that figure. Thus, in the preheating or vaporizing furnace the flow of the heating gases are countercurrent with respect to the flow of the materials to be heated.

By way of completion of a description of the preheating or vaporizing furnace, the outside of the refractory walls are covered by means of suitable material such as a sheet of steel or iron 23. The top of the furnace is also formed of a slab or slabs of refractory material and a roof 24 is placed over the entire furnace. The furnace as a whole rests upon a suitable foundation 25.

The vaporized materials to be cracked leaving the preheating furnace through the pipe 17 are conducted to the cracking unit now to be described through pipes 26 and 27. Their injection into the cracking unit may be controlled by suitable valves 28.

The cracking unit itself is generally designated by the numeral 29 and the gas to be treated or cracked is led through the relatively thick refractory wall of this unit by means of pipes 30. (See particularly Fig. 5.)

The relatively thick refractory walls of the furnace are illustrated at 31 in Fig. 5 and are covered by suitable retaining sheets such as the steel or iron sheets 32. The refractory walls are preferably formed in one piece with the top and bottom of the cracking unit, leaving a hollow cracking space 33 within the unit.

Extending lengthwise through the space 33 are a plurality of refractory tubes 34 arranged in tiers one above the other for a purpose presently to be set forth. The top of the cracking unit is provided with a metal or other suitable cover 35 which merely serves as a jacket for the refractory member 31, and the member 31 has a plurality of openings 36 therein extending from the interior of the space 33 to the outside of the refractory member 31, and the top shield 35 is provided with a substantially semi-cylindrical hood or dome 37 adapted to receive gases issuing through the openings 36.

The dome 37 is connected to a header 38 which is located above this dome, these connections being by means of a plurality of short tubular members 39 which extend in a vertical direction. Leading directly upwardly from the header 38 is a gas take-off conduit 40 which leads up and over into a quenching drum 41 where it is suddenly chilled. The pressure within this quenching drum is preferably maintained substantially at atmospheric pressure or perhaps slightly therebelow. The drum is provided with a pressure gauge 42 for the purpose of enabling an operator to observe the pressure existing therein, and is also provided with a thermostatic device 43 whereby it will be possible to determine the temperature existing within the drum and to control the injection of water or other quenching medium into the drum.

The gas outlet for the drum is indicated at 44 and a liquid drain at the lower portion of the drum is shown at 45. The quenching liquids such as water or the like will be injected through the conduit 46 at the upper end of the drum, this conduit having a jet on its inner end so as to provide for an intimate contact between the gas issuing from the cracking unit and the quenching fluid.

The products of combustion issuing from the preheating furnace are taken off through a suitable stack 47, being conveyed thereto by means of a pipe 48. Surrounding this pipe is a preheating unit 49 adapted to preheat gas supplied to the unit by means of a pipe 50. The gas is led from the preheating unit 49 by means of a second pipe 51, and is fed through suitable control valves 52 to a plurality of burners 53 located in the outer ends of the refractory tubes 34. The opposite ends of these refractory tubes are connected to the interior of the preheating furnace as shown at 54 so that flame and products of combustion from the burners 53 will pass lengthwise through the interiors of the respective refractory tubes and after heating these tubes will pass into the interior of the preheating furnace, thus providing a supply of heat for this furnace. If desired, in order to prevent the too rapid passage of flame and products of combustion through the refractory tubes, an obstruction in the form of a fire brick or the like 55 may be placed in the outlet of each tube. By the expedient just described, the tubes are heated from their interior, and sufficient heat is supplied by the burners 53 so that the temperature gradient from one end of the tubes to the other will be extremely small. In order to accomplish this it is, of course, necessary to provide some means for utilizing the waste heat from the tubes, and for this reason the exhaust from these tubes is led into the preheating furnace where it is substantially used before passing into the stack 47. For the purpose of controlling the heating of the tubes suitable thermostats 56 are provided in connection with the cracking unit.

It will be seen that in the apparatus just described, oil to be cracked, which oil may be liquid hydrocarbons or the like, is passed in through the line 1 into the preheating or vaporizing furnace. It then passes through the coil banks 5, 10, 12 and 13 and is in these coil banks vaporized and preheated to a temperature approaching the cracking temperature before being led into the cracking unit itself. Within the preheating furnace it is subjected both to the heat from the burners 21 and to the heat from the gases issuing from the refractory tubes 34.

Upon being led into the cracking unit through the pipes 30 provided for this purpose, the vapor or gas is now forced to flow in close relationship about the outside of the heated tubes 34. These tubes are arranged one above the other and it will be seen that if all tubes are supplied with the same amount of heat from their respective burners, the uppermost tubes in each tier will be the hottest of all the tubes in that tier because the relatively cool gas passing over the lower tubes will extract more heat from those tubes than will the now heated gas passing over the upper tubes. The gas to be cracked therefore comes in contact with the hottest tubes last and is thus raised to the cracking temperature by the hottest of the tubes in the cracking unit.

The temperatures at which the various tubes are maintained will be calculated to just bring the gas up to the desired cracking temperature and keep it there for the necessary period of time before the gas leaves the cracking unit. The gas can be made to flow very fast and the time during which the gas is at cracking temperature may therefore be limited to any period desired so that the proper amount of cracking will take place and the products of the cracking will not be still further cracked into undesirable products.

As the gas leaves the cracking unit it is conducted very rapidly through the header 38 and the pipe 40 to the quenching drum 41 where it is brought into contact with water being jetted into the drum. By this means it is quickly cooled to a point well below the cracking temperature so that all reaction within the gas is immediately suspended.

Inasmuch as the heat supplied to the various tubes is in such a quantity that the temperature of any one tube will not vary substantially from one end to the other thereof, all of the gas passing through the cracking unit will be heated by substantially the same amount and maintained in contact with the tubes substantially the same length of time, and consequently the cracking in all portions of the gas will be substantially uniform.

Figure 6:
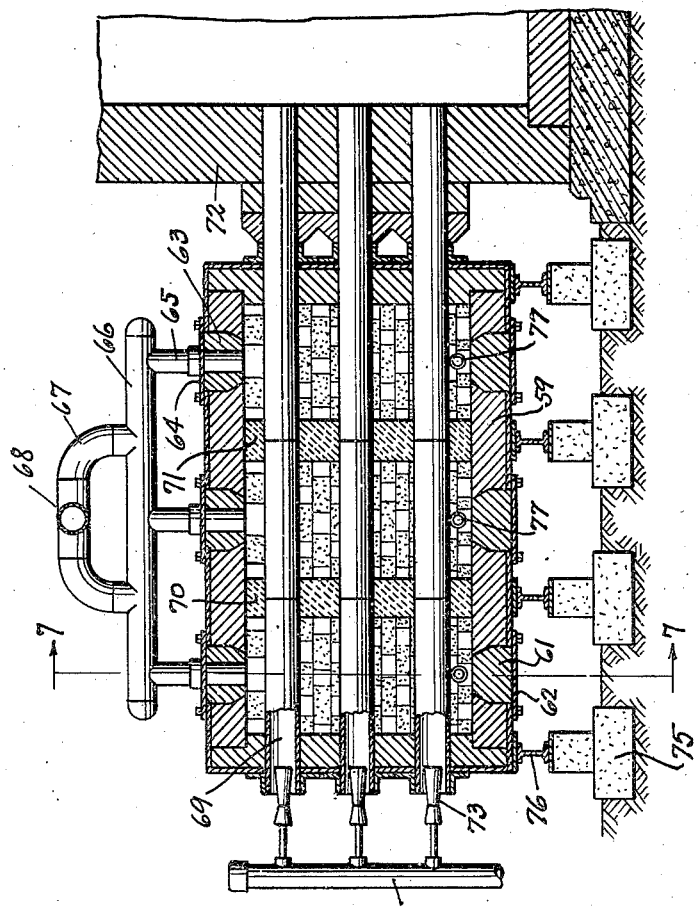
Fig. 6 is a longitudinal vertical cross section through a somewhat modified form of cracking unit.
Figure 7:
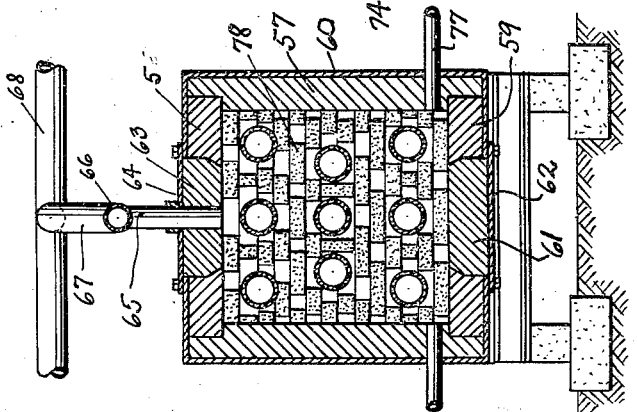
Fig. 7 is a transverse vertical cross section taken along the line 7—7 of Fig. 6.

In Figs. 6 and 7 there is illustrated a somewhat modified form of cracking unit which is particularly adapted for cracking in those instances requiring the use of a catalyst. This unit is very similar to the unit just described, differing therefrom, however, in constructional details so as to provide space for the catalyst.

The unit shown in Figs. 6 and 7 comprises sidewalls 57 and a top 58 and bottom 59, all constructed of suitable refractory building material and resting upon suitable foundation. The unit is enclosed by means of a sheathing or cover 60 of sheet metal or the like and the top and bottom respectively have manholes therein affording access to the interior of the unit for the purpose of removing and replacing the catalyst, cleaning out deposits of material resulting from the cracking process, etc.

The bottom 59 has manholes therein adapted to be closed by means of manhole closures 61, of refractory material. It will be seen that the manholes themselves have a portion of their walls tapered inwardly so that when the closure 61 is put in place, its similarly tapered portions will come in contact with the tapered portions inside the manhole and the closure will be prevented from moving further inwardly toward the interior of the cracking unit. These manhole closures 61 are held in place by means of plates or sheets 62 extending over their exterior surfaces and bolted or otherwise secured in place to the surrounding edges of the sheathing 60.

Likewise, the manholes in the upper or top wall of the cracking unit are closed by means of closures 63 having plates or sheathing 64 extending over the outer surfaces thereof and bolted or otherwise secured to the adjacent edges of the sheathing 60 of the cracking unit.

The manhole closures 63 are provided with openings through which extend the take-off pipes 65 which in turn connect with the header 66. The header 66 is connected by means of two branches 67 to a collector pipe 68 corresponding to the pipe 40 of the previously described form, which pipe serves to take off the products of the cracking and conduct them to the point where they are quenched.

The tubes which extend through the cracking unit are in this instance made up of sections 69, a number of which may be employed to form one continuous tube through the unit. It will be seen that one end of each of these tubes extends through the rear wall of the cracking unit and through the adjacent wall of a preheater unit as illustrated in Fig. 6 so as to conduct the excess heat being supplied to each tube into the preheating unit and make possible its use.

The tubes may be supported intermediate their ends by means of loose brickwork walls 70 and 71 respectively. The catalyst which is to be used may be partly incorporated in the said loose brickwork walls 70 and 71 and may be additionally incorporated in similar brickwork or blocks to be placed in the interior chambers of the cracking unit about the tubes in such a loosely laid manner that they will not substantially hinder the flow of gas through the unit.

The gas is adapted to enter the unit through pipes 77 corresponding in every respect to the pipes 30 hereinbefore referred to and to pass outwardly from the unit through the pipes 65 as above described.

As illustrated, the tubes pass into the interior of a preheating chamber through its wall 72, and adjacent the opposite ends these tubes are provided with burners 73 adapted to project a flame into the interior of the tubes and through each tube respectively into the interior of the preheating unit. The respective burners 73 are supplied with fuel through a suitable pipe or conductor 74.

The unit as above mentioned is provided with a suitable foundation 75 upon which are placed supports which may be in the form of I-beams 76. The cracking unit is mounted directly on these supports.

At 78 there is illustrated additional brickwork or the like for the purpose of supplying the necessary catalyst within the cracking zone.

It will be appreciated that the form illustrated in Figs. 6 and 7 is very similar to that heretofore described and illustrated in Figs. 1 to 5 inclusive, but that it differs therefrom in that more tubes are employed and thus a more gradual and better controlled heating of the material supplied to the cracking unit may be had. Furthermore, space is provided within the cracking unit for the use of a catalyst and means are provided for access to the interior of the cracking unit so that the catalyst may be replaced and so that the unit itself may be cleaned out.

It will be appreciated that while all of the burners 73 illustrated in Figs. 6 and 7 may be identical, and while all of the burners 53 illustrated in Figs. 1 to 5 inclusive may be identical, these may be regulated so that different ones supply more or less heat to their respective tubes.

It will be understood that by so regulating these burners and thus controlling the amount of heat supplied to each tube, the rate of heating of the material supplied to the cracking chamber may be varied and closely governed and thus a very accurate control can be maintained over the cracking process itself.

Figure 8:
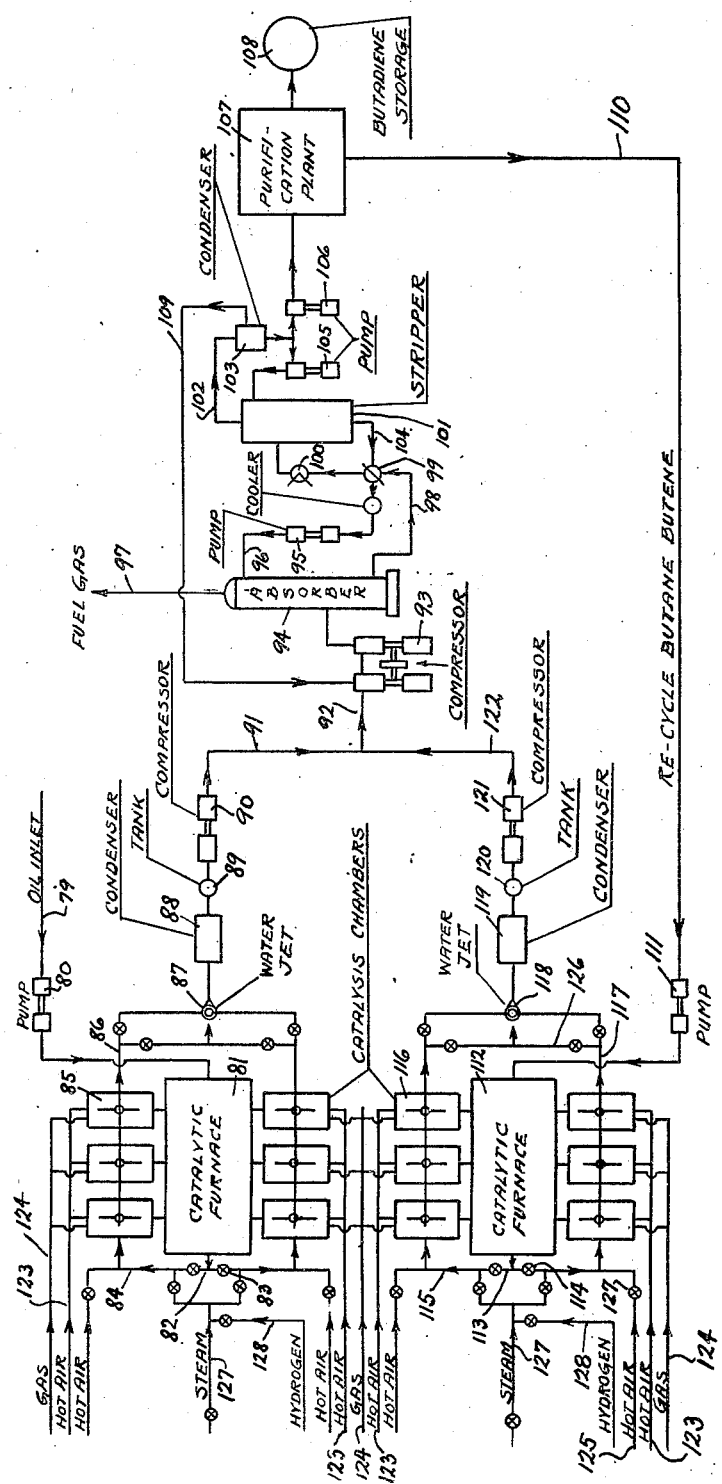
Fig. 8 is a diagrammatic view illustrating in outline form a layout and flow sheet for a complete plant constructed in accordance with this invention and adapted for the cracking of hydrocarbon oils in the manufacture of butadiene.

Referring now to Fig. 8, and to the diagrammatic illustration of the plant for carrying out the process and using the apparatus to which this invention relates, there is illustrated an oil inlet 79 which leads the oil or other material to be cracked to the pump 80. This pump 80 is not adapted to provide any substantial pressure but merely to force the material to be cracked through the catalytic furnace and cracking chambers to which this invention relates. The catalytic furnace as above referred to, acts as a preheating or vaporizing chamber for the purpose of vaporizing and preheating the material before it enters the cracking or catalysis chambers.

The material to be cracked passes from the pump 80 directly into the catalytic furnace 81 where it is vaporized and heated substantially. From this furnace it passes out at the opposite end 82 and is caused to flow in one of two opposite directions through the valve 83 and pipe 84 into one of the banks of catalysis chambers 85. It will be understood that the catalytic furnace 81 is in substance identical with the preheating furnace illustrated in Figs. 1 to 4 inclusive and that the so-called catalysis chambers 85 correspond to the cracking units illustrated in Figs. 1, 2, 3 and 5 on the one hand or Figs. 6 and 7 on the other hand.

Emerging from the catalysis chambers 85, the materials which have been cracked are conducted through a pipe 86 to a water jet 87 where they are suddenly quenched to stop the cracking action. From the water jet they are conducted to a condenser 88 where the liquefiable constituents are condensed and removed, and the gaseous constituents are then conducted through a suitable tank 89 to a compressor 90 which forces them through pipes 91 and 92 to a second compressor 93. The gases are then conducted into the absorber 94 where they are subjected to the action of an absorption oil pumped through a pump 95 and a pipe 96 to the upper end of the absorber. The dry gas from the upper end of the absorber passes off through a suitable outlet 97 while the rich oil from the absorber passes off through a lower outlet 98, through heat exchanger 99 where it receives heat from the lean oil going to the absorber, through a heater 100 where it is further heated, and to the stripper or still 101 where the absorbed constituents are driven off from the rich absorption oil and caused to pass out through a line 102 from the top of the stripper and into a condenser 103. The lean absorption oil is drawn off from the stripper through a line 104, passed through the heat exchanger 99 where it gives up a portion of its heat, through a cooler where it is still further cooled, and then to the pump 95 to complete its cycle.

The condensible portions of the material going into the condenser 103 are drawn off from the lower portion thereof and part of this condensed material is pumped through a pump 105 back to the upper end of the stripper as a reflux, while the other portion is pumped through a pump 106 to a purification plant and subsequently to butadiene storage, it being understood that in this instance the layout diagrammatically illustrated is for the purpose of producing butadiene. The purification plant is designated by the numeral 107 and the butadiene storage tank by numeral 108.

The uncondensible constituents from the condenser 103 are taken off through a suitable gas line 109 and conducted back to the compressor 93 to be reinjected into the absorber 94.

From the purification plant 107, the constituents separated from the butadiene are drawn off through a line 110 as recycle butane or butene. These are injected by means of a pump 111 into a second catalytic furnace 112 which may be identical in every respect with the previously described catalytic furnace 81. In this furnace these constituents are vaporized and preheated and drawn off at the point 113 so that they may be conducted through one of the valves 114 and pipe 115 to one of the banks of catalysis chambers 116 which are identical with the catalysis chambers 85 heretofore described.

From the catalysis chambers 116 the cracked gases are drawn off through a line 117 and conducted to a water jet 118 where they are quenched in the same manner as in the water jet 87 heretofore described. They are then conducted to a condenser 119 for the purpose of condensing out the readily condensible constituents, and to a tank 120. Thence they are passed through a compressor 121 at a line 122 to the line 92, whence they go through the same apparatus that has heretofore been described.

Each of the burners for the catalysis chambers 85 and 116 is provided with a hot air supply pipe 123 and with a gas supply pipe 124. A hot air supply line 125 is also provided for each of the banks of catalysis chambers 85 and 116 and each of these banks of chambers is also provided with a properly valved waste line 126.

A steam supply is made available through a line 127 and through suitable valves connections to each of the banks of catalysis chambers, and likewise a hydrogen supply is made available to the same banks of chambers through a supply line 128.

It is intended that the arrangement just described will be operated with only one of the banks of catalysis chambers 85 and only one of the banks of catalysis chambers 116 in use at one time. While the two banks of catalysis chambers referred to are thus in use, the other bank of catalysis chambers 85 and the other bank of catalysis chambers 116 will first be subjected to a steam purge by admitting steam from the line 127 through the valve arrangement provided into the idle banks of catalysis chambers. Of course the corresponding valve 114 will be closed during this time so as to shut off such banks of catalysis chambers from their corresponding catalytic furnace. At the same time, the valves controlling the lines 86 and 117 from the idle catalysis chambers will be closed and the valves controlling the waste lines 126 will be opened.

If it be assumed that the banks of catalysis chambers will be designed for operation over a period of fifteen minutes and then a period of fifteen minutes allowed for cleaning, the steam purge just referred to will preferably continue for a period of approximately two and one-half minutes. It will then be followed by a hot air regeneration period during which hot air from the lines 125 will be forced through the idle banks of catalysis chambers by opening the valves 127 corresponding thereto. This regeneration will continue for a period of approximately seven and one-half minutes and will be followed by a second steam purge brought about in the same manner as the first and continuing likewise for a period of approximately two and one-half minutes. During the remaining two and one-half minutes of the idle portion of the cycle for a given bank of catalysis chambers, the chambers will preferably be subjected to a reducing purge during which hydrogen from the line 128 will be forced through the bank of chambers. At the end of the period of fifteen minutes, the operation will be shifted so that the bank of chambers 85 and the bank of chambers 116 which has been idle will be changed over to receive the output from the corresponding catalytic furnace 81 or 112, and the opposing bank of chambers connected to the same furnace will become idle and will be purged in the manner above described. Thus at all times there will be a complete bank of catalytic chambers connected with each catalytic furnace and carrying on the cracking operation, while at the same time there will be another bank of catalysis chambers connected with the same furnace undergoing a purge and being made ready for the next period during the cycle of operation.

In an actual test of the apparatus illustrated in Figs. 1 to 5, inclusive hydrocarbons of the following characteristics were fed to the plant at the rate of twelve gallons per hour, together with a quantity of steam which yielded seventeen gallons of condensed water per hour:

| | |
|---|---|
| A. P. I. gravity at 60° F | 62.3 |
| Specific gravity | .7301 |
| Mol weight | 113 |
| Characterization factor | 12.3 |
| Initial boiling point °F | 182 |
| End point °F | 390 |
| Recovery | 98.8 |
| Residue | .8 |
| Distillation loss | .4 |

During the test the average temperature of the preheating coils in the preheating furnace was 973° F. delivering a preheated mixture to the cracking furnace at 890° F. The average temperature of the cracking furnace was 1433° F. adjacent the surfaces of the refractory tubes and 1177° F. adjacent the surfaces of the refractory walls of the cracking unit. The average inlet pressure to the preheater furnace was 58 lbs. per square inch gauge pressure while the outlet pressure from that furnace was 13 lbs. per square inch gauge pressure. The average presure in the quenching tank was 0 gauge pressure.

Following is an analysis of the resulting vapors:

| Absorption Analysis | | Fractional Analysis | |
|---|---|---|---|
| | Per cent | | Per cent |
| Hydrogen | 25.48 | Hydrogen | 25.48 |
| Paraffin Hydrocarbons | 38.25 | Methane | 39.24 |
| Butadiene | 1.50 | Ethene | 21.35 |
| Unsaturates | 26.90 | Ethane | 1.47 |
| Carbon Monoxide | 1.20 | Propene | 2.30 |
| Carbon Dioxide | 6.67 | Butane Unsaturates | 1.32 |
| | 100.00 | Pentanes and Heavier | .97 |
| Butadiene (By Weight) | 2.6 | Carbon Monoxide | 1.20 |
| | | Carbon Dioxide | 6.67 |
| | | | 100.00 |

A small amount of dark brown tarlike liquid was also recovered.

In a second run with the same apparatus, the rate of hydrocarbon feed was increased to 24 gallons per hour with the steam recovering the same as in the previous run. The average temperature of the preheater furnace was maintained at 1053° F. delivering a preheated mixture to the cracking unit at 977° F. The cracking unit was operated at 1430° F. adjacent the surfaces of the refractory tubes and at 1140° F. adjacent the surfaces of the inner walls of the unit. The average inlet pressure to the preheater furnace was 76 lbs. per square inch gauge pressure whereas the outlet pressure therefrom was 22.5 lbs. per square inch gauge. The pressure on the quench tank was maintained at 0 lbs. per square inch gauge pressure. There was some increase in the liquid products formed on this run as compared with the previous run. Two samples of the vapors were taken on this test with an interval of one hour between samples. Following is an analysis of these samples:

*First sample*

| Absorption Analysis | | Fractional Analysis | |
|---|---|---|---|
| | Per cent | | Per cent |
| Hydrogen | 19.11 | Hydrogen | 19.11 |
| Paraffin Hydrocarbons | 39.88 | Methane | 38.54 |
| Butadiene | 2.45 | Ethene | 27.85 |
| Unsaturates | 34.83 | Ethane | 2.21 |
| Carbon Monoxide | .62 | Propene | 4.91 |
| Carbon Dioxide | 3.11 | Butane Unsaturates | 2.31 |
| | 100.00 | Pentanes and Heavier | 1.34 |
| | | Carbon Monoxide | .62 |
| Butadiene (By Weight) | 4.0 | Carbon Dioxide | 3.11 |
| | | | 100.00 |

*Second sample*

| Absorption Analysis | | Fractional Analysis | |
|---|---|---|---|
| | Per cent | | Per cent |
| Hydrogen | 17.47 | Hydrogen | 17.47 |
| Paraffin Hydrocarbons | 40.92 | Methane | 42.47 |
| Butadiene | 2.05 | Ethene | 24.58 |
| Unsaturates | 35.83 | Ethane | 2.52 |
| Carbon Monoxide | .60 | Propene | 5.54 |
| Carbon Dioxide | 3.13 | Butane Unsaturates | 2.52 |
| | 100.00 | Pentanes and Heavier | 1.17 |
| | | Carbon Monoxide | .60 |
| Butadiene (By Weight) | 3.4 | Carbon Dioxide | 3.13 |
| | | | 100.00 |

From the foregoing it will be seen that a means has been provided whereby all of the objects and advantages sought by this invention may be attained. More particularly it will be seen that a means has been provided wherein very accurate control of the cracking operation may be maintained at all times and an apparatus has been provided which is capable of taking either gaseous or liquid material to be cracked. Furthermore, an apparatus has been provided which is capable of providing space for catalytic agents and a means has been provided for conserving what would otherwise amount to a large amount of waste heat.

Finally it will be seen that a layout has been provided for the comparatively efficient production of butadiene or the like from liquid hydrocarbons.

Having described my invention, I claim:

1. In an apparatus for cracking chemical compounds which are liquid at normal atmospheric temperatures and pressures, a preheating furnace for receiving an initially vaporizing the compounds to be cracked, a refractory tube, an adjustable burner individual to said tube with its nozzle projecting into one end thereof, second tubes positioned beneath and transversely of said refractory tube for conducting the vaporized compound from said preheating furnace to the exterior of said refractory tube, confining refractory walls so constructed and arranged that the vaporized compound flows about said refractory tube to raise the compound to the desired cracking temperature, said preheating furnace and said refractory tube being in communication with each other.

2. In an apparatus for cracking chemical compounds which are liquid at normal atmospheric temperatures and pressures, a preheating furnace for receiving and initially vaporizing the compounds to be cracked, means for heating said furnace, a refractory tube, an adjustable burner individual to said tube with its nozzle projecting into one end thereof and independent of the furnace heating means, second tubes positioned beneath and transversely of said refractory tube for conducting the vaporized compound from said preheating furnace to the exterior of said refractory tube, confining refractory walls so constructed and arranged that the vaporized compound flows about said refractory tube to raise the compound to the desired cracking temperature, said preheating furnace and said refractory tube being in communication with each other.

3. In an apparatus for cracking chemical compounds which are liquid at normal atmospheric temperatures and pressures, a preheating furnace for receiving and initially vaporizing the compounds to be cracked, a refractory tube, an adjustable burner individual to said tube with its nozzle projecting into one end thereof, second tubes positioned beneath and transversely of said refractory tube for conducting the vaporized compound from said preheating furnace to the exterior of said refractory tube, confining refractory walls so constructed and arranged that the vaporized compound flows about said refractory tube to raise the compound to the desired cracking temperature, said preheating furnace and said refractory tube being in communication with each other, and a refractory obstruction in said refractory tube and near the outlet end thereof adjacent said preheating furnace.

WILLIAM F. FULTON.

REFERENCES CITED

The following references are of record in the file of this patent:

UNITED STATES PATENTS

| Number | Name | Date |
|---|---|---|
| 1,949,563 | Duke | Mar. 6, 1934 |
| 1,427,554 | Selden | Aug. 29, 1922 |
| 1,973,851 | Feiler et al. | Sept. 18, 1934 |
| 2,035,275 | Pfau et al. | Mar. 24, 1936 |
| 1,843,171 | Morrell et al. | Feb. 2, 1932 |
| 1,589,631 | Dieterle | June 22, 1926 |
| 1,763,609 | Weaver | June 10, 1930 |
| 1,886,621 | Bagwill | Nov. 8, 1932 |
| 2,045,114 | Zublin | June 23, 1936 |
| 2,092,221 | Morrison | Sept. 7, 1937 |
| 2,112,149 | Edwards | Mar. 22, 1938 |

FOREIGN PATENTS

| Number | Country | Date |
|---|---|---|
| 613,231 | French | Aug. 20, 1926 |
| 622,715 | French | Mar. 7, 1927 |